US010790671B2

(12) United States Patent
Gudgel et al.

(10) Patent No.: US 10,790,671 B2
(45) Date of Patent: *Sep. 29, 2020

(54) MODULAR INVERTER SYSTEM AND CHARGING SYSTEM FOR OFF-GRID POWER GENERATION

(71) Applicant: MidNite Solar, Inc., Arlington, WA (US)

(72) Inventors: Robin Wayne Gudgel, Arlington, WA (US); Robert Dean Gudgel, Everett, WA (US); Justin A. King, Arlington, WA (US); Mario A. Rodriguez Perez, Marsville, WA (US); Robert Anthony Quarterman, Granite Falls, WA (US)

(73) Assignee: Midnite Solar, Inc., Arlington, VA (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/279,004

(22) Filed: Feb. 19, 2019

(65) Prior Publication Data

US 2019/0260206 A1    Aug. 22, 2019

Related U.S. Application Data

(63) Continuation of application No. 15/264,359, filed on Sep. 13, 2016, now Pat. No. 10,211,636.

(51) Int. Cl.
*H02J 3/38* (2006.01)
*H02M 7/04* (2006.01)
(Continued)

(52) U.S. Cl.
CPC ............... *H02J 3/382* (2013.01); *H02J 3/32* (2013.01); *H02J 3/383* (2013.01); *H02J 3/386* (2013.01);
(Continued)

(58) Field of Classification Search
CPC .. H02J 3/382; H02J 2007/0059; H02J 7/0052; H02J 3/386; H02M 7/44; H02M 7/04
See application file for complete search history.

(56) References Cited

U.S. PATENT DOCUMENTS 6,153,947 A    11/2000  Rockow et al.
6,840,783 B2   1/2005   Wolford et al.
(Continued)

*Primary Examiner* — Jared Fureman
*Assistant Examiner* — Duc M Pham
(74) *Attorney, Agent, or Firm* — FisherBroyles LLP; Kevin D. Jablonski

(57) ABSTRACT

Systems, apparatuses, and methods for a modular inverter system having a single device enclosure with a plurality of module receptacles capable of receiving one or more modules having tailored functionality. Such modules work in conjunction with each other to handle control of various power sources and power sinks in a mixed use power generation and consumption system. In various embodiments, these swappable modules include a charge controller module configured to control charging a battery, an inverter/charger module configured to convert an AC voltage to a DC voltage for charging the battery and configured to invert a DC voltage to an AC voltage for supplying AC power, a controller module configured to control the plurality of inverter/charger modules and the charge controller module; and a backplane disposed in the enclosure such that each module receptacle facilitates engaging a respective module with the backplane.

19 Claims, 4 Drawing Sheets

(51) Int. Cl.
*H02M 7/44* (2006.01)
*H02J 7/04* (2006.01)
*H02J 3/32* (2006.01)
*H02J 7/00* (2006.01)
*H02J 7/34* (2006.01)
*H02J 7/35* (2006.01)
*H02J 9/08* (2006.01)
*H02M 7/00* (2006.01)

(52) U.S. Cl.
CPC ...... *H02J 7/00* (2013.01); *H02J 7/04* (2013.01); *H02M 7/04* (2013.01); *H02M 7/44* (2013.01); *H02J 3/381* (2013.01); *H02J 3/385* (2013.01); *H02J 7/34* (2013.01); *H02J 7/35* (2013.01); *H02J 9/08* (2013.01); *H02J 2207/20* (2020.01); *H02M 7/003* (2013.01); *Y02B 10/70* (2013.01); *Y02E 10/56* (2013.01); *Y02E 10/76* (2013.01); *Y02E 70/30* (2013.01)

(56) References Cited

U.S. PATENT DOCUMENTS

| | | | |
|---|---|---|---|
| 7,929,327 | B2 | 4/2011 | Haines et al. |
| 10,211,636 | B2* | 2/2019 | Gudgel ............... H02J 3/382 |
| 2003/0036806 | A1 | 2/2003 | Schienbein et al. |
| 2005/0254210 | A1 | 11/2005 | Grady et al. |
| 2009/0256422 | A1 | 10/2009 | Fox et al. |
| 2011/0149508 | A1 | 6/2011 | Malekmadani |
| 2011/0159727 | A1 | 6/2011 | Howard et al. |
| 2011/0204720 | A1 | 8/2011 | Ruiz et al. |
| 2011/0273130 | A1 | 11/2011 | Lee et al. |
| 2011/0286186 | A1 | 11/2011 | Tart et al. |
| 2012/0126623 | A1 | 5/2012 | Koehl |
| 2012/0201016 | A1 | 8/2012 | Robertson et al. |
| 2013/0187464 | A1 | 7/2013 | Smith et al. |
| 2016/0043555 | A1 | 2/2016 | Howell |
| 2016/0173672 | A1 | 6/2016 | Boyce |
| 2016/0190812 | A1 | 6/2016 | Myer |
| 2016/0214491 | A1 | 7/2016 | Yoko et al. |
| 2016/0226252 | A1 | 8/2016 | Kravitz et al. |
| 2017/0047772 | A1 | 2/2017 | Wang et al. |
| 2017/0061095 | A1 | 3/2017 | Waskin et al. |
| 2017/0149248 | A1* | 5/2017 | Della Sera ............... H02J 3/38 |
| 2017/0229866 | A1 | 8/2017 | Ghotra et al. |
| 2017/0265585 | A1 | 9/2017 | Della Sera et al. |
| 2017/0346292 | A1 | 11/2017 | Handelsman et al. |
| 2018/0054070 | A1 | 2/2018 | Krishnamoorthy et al. |
| 2018/0076625 | A1 | 3/2018 | Gudgel et al. |

\* cited by examiner

MODULAR INVERTER SYSTEM AND CHARGING SYSTEM FOR OFF-GRID POWER GENERATION

BACKGROUND

Modern society requires a large amount of electrical power generated from a variety of sources. Such power may often be generated on macro levels at facilities such as hydroelectric dams, coal and natural gas-driven generators, and nuclear power plants. As technology improves in other areas, solar-powered generators and wind-powered generators are also becoming a more prevalent source of power generation in society. Generating electrical power has conventionally been accomplished by large enterprises on massive scales, such as utility companies and power companies that produce energy on the order of megawatts and tie directly to a national electrical grid. However, some newer technologies, such as solar and wind, may be well suited to produce energy on micro levels such that individual home owners and businesses may own solar- and wind-driven power generators that may supply power to a local house or even produce small amounts of energy to be fed back to the electrical grid.

As a result, a local power sink (e.g., a home), may sometimes draw power from the national electrical grid or from a local micro-generator (or both). Thus, the connection point for the local micro-generator may use a switch controller to facilitate the connections to and from the home and to and from the electrical grid. This may typically involve an inverter/charger because the local micro-generator may produce electrical energy at a voltage that is incongruent with a typical AC voltage of 120/240 volts and 60 Hz. Therefore, local switching circuitry that includes control logic, a proper number and size of inverters/chargers, and a battery for storing electrical energy are all components of a local system needed to properly generate, use and store electrical energy from a local micro-generator.

BRIEF DESCRIPTION OF THE DRAWINGS

Embodiments of the subject matter disclosed herein in accordance with the present disclosure will be described with reference to the drawings, in which.

Note that the same numbers are used throughout the disclosure and figures to reference like components and features.

DETAILED DESCRIPTION

Figure 1:
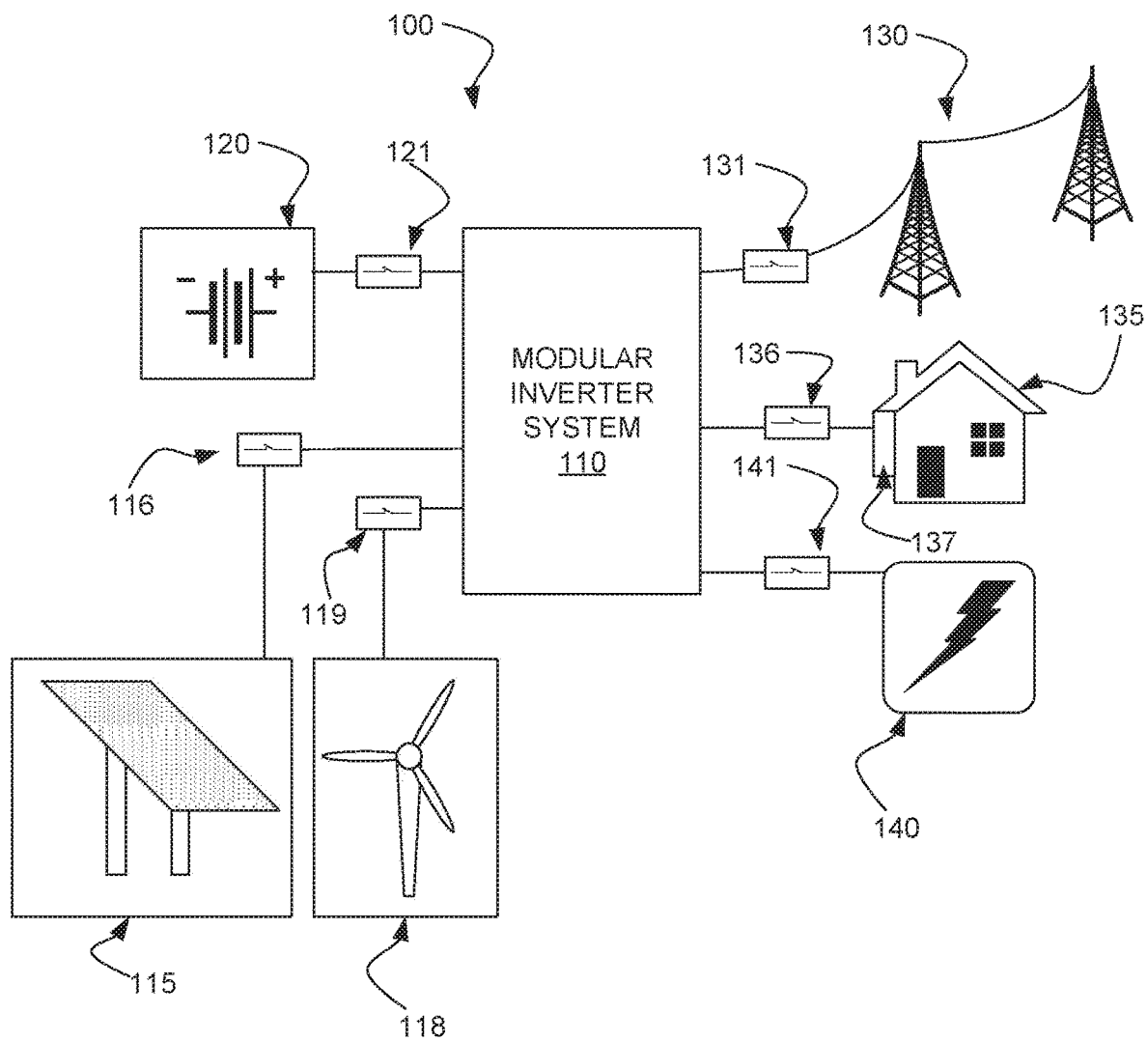
FIG. 1 is a block diagram of an electrical system at a micro level that includes a modular inverter system according to an embodiment of the subject matter disclosed herein.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of overview, the systems and methods discussed herein may be directed to a modular inverter system having a single device enclosure with a plurality of module receptacles capable of receiving one or more modules having tailored functionality. Such modules work in conjunction with each other to handle control of various power sources and power sinks in a mixed use power generation and consumption system. In various embodiments, these swappable modules include a charge controller module configured to control charging a battery, an inverter/charger module configured to convert an AC voltage to a DC voltage for charging the battery and configured to invert a DC voltage to and AC voltage for supplying AC power, a controller module configured to control the plurality of inverter/charger modules and the charge controller module; and a backplane disposed in the enclosure such that each module receptacle facilitates engaging a respective module with the backplane.

The modular inverter system, as described, provides a number of advantages over conventional non-modular solutions. First, as a local power requirement grows, one can easily add additional functionality to the modular inverter system by simply inserting an additional module. For example, as the AC draw from a battery may grow because a home has added new circuits, one may add an additional inverter/charger module to supply inverted AC power from a local battery stack. Second, a modular inverter system allows for swapping and maintenance while the system remains under load. That is, the modules in the modular inverter system are hot-swappable. Third, the modular inverter system provides a simple and manageable solution for an inverter-grid tie-in such that local power generation system (e.g., wind, solar, and the like) may be continuously in use even if a battery stack is fully charged. That is, the local power that is generated may be sold back to the power company. These and other advantages will become more apparent with the discussion below in conjunction with FIGS. 1-5.

FIG. 1 is a block diagram of an electrical system 100 at a micro level that includes a modular inverter system 110 according to an embodiment of the subject matter disclosed herein. The electrical system 100 may typically be a power sink (e.g., a home, a building, and the like) with various capabilities for receiving electrical power from an electrical grid 130 or for generating local electrical power from one or more power generation sources. In this example, the power sink is a residential home 135 having a local electrical distribution panel 137 that may include a typical array of electrical devices that consumer power, such as electric heaters, lights, kitchen appliances and the like. Of course, the power sink may be any other facility, building, complex, or standalone device that uses electrical power for operation. As is common, one source for electrical power for the home 135 is the national electrical grid 130 or simply grid 130, hereinafter. In the United States, the national electrical grid comprises a power source with a nearly constant voltage of 120/240 VAC with a nearly constant frequency of 60 Hz. Industrial and commercial scenarios may further involve 3-phase connections at 208 VAC. In other countries, the grid may vary to include voltages up to 240 V and frequencies down to 50 Hz. For this example, the grid will comprise a nearly constant voltage of 120/240 VAC with a nearly constant frequency of 60 Hz.

The grid 130 may be coupled to the home through the modular inverter system 110 in this example. Further, these electrical connections may include respective circuit breakers/disconnect switches (switch 131 associated with the grid 130 and switch 136 associated with the home 135) that may be part of the modular inverter system 110 and controlled by the modular inverter system 110. Each of the switches shown in FIG. 1 may be circuit breakers and may also be part of the modular inverter system 110 in order to comply with NEC rules and code for providing circuit protection for each of the various electrical connections throughout the system of FIG. 1. As such, these switches, throughout this disclosure may be referred to as disconnect switches or circuit breakers without limitation on underlying function. The specific parameters of control are discussed further below. For now, attention is turned to alternative sources for electrical power associated with the system 100 of FIG. 1.

A first local power source (other than the grid 130) may be an electrical generator 140 coupled to the modular inverter system 110 though an associated disconnect switch 141. The electrical generator 140 may be a gasoline-fired generator, a natural gas-fired generator, a propane-fired generator or any other generator that is capable of generating electrical power at a nearly constant voltage of 120/240 VAC with a nearly constant frequency of 60 Hz. Such a local electrical generator 140 may be used at the home 135 to supply electrical power in lieu of the electrical grid 130 in grid power outages. Since the electrical generator 140 generates electrical power with the same parameters as the grid 130, the modular inverter system 110 simply provides the capabilities of a transfer switch. Such a transfer switch is discussed further below with respect to FIG. 2, but for now, it is sufficient to understand that the transfer switch prevents the grid 130 and the generator 140 from being simultaneously coupled to the home 135 (via mutually exclusive control of switches 141 and 131).

Aside from the power sources that supply power at a nearly constant voltage of 120/240 VAC with a nearly constant frequency of 60 Hz (generator 140 and grid 130), additional local power sources may be used in conjunction with a local battery array 120. A first example of a local power source may be a solar panel array 115 configured to convert solar energy into electrical energy. This converted electrical energy may be used to provide charge to the battery array 120 and may be isolated from the battery array via disconnect switch 118. A typical solar array 115 will generate electrical power at approximately 600 VDC with individual panels generating about 10-20 VDC each. Similarly, a second example of a local power source may be a wind turbine 118 configured to convert wind energy into electrical energy. Other local power sources contemplated but not shown include fuel cells and hydro-electric generators that may include commercial applications up to 1000 VDC. This converted electrical energy may be used to provide charge to the battery array 120 and may be isolated from the battery array via disconnect switch 119. A typical wind turbine will generate electrical power at approximately 600 VDC.

As these local power sources (solar panel 115 and wind turbine 118) typically do not generate power at that which is typically used at a home 135 (a nearly constant voltage of 120/240 VAC with a nearly constant frequency of 60 Hz), the battery array 120 may be used to store electrical charge generated from the local VDC sources. Further, any battery array 120 will only provide a direct current (DC) voltage (typically 48 VDC) and most power sinks require alternating current (AC) voltage (Typically 120/240 VAC). Thus, the modular inverter system 110 may be used to invert DC voltage from the battery array 120 into AC voltage for use at the home 135. Therefore, the battery array may be electrically isolated at times from the modular inverter system 110 via disconnect switch 121.

Each of the disconnect switches in FIG. 1 (116, 119, 121, 131, 136, and 141) may be housed within and controlled by the modular inverter system 110 at various times according to what power source may be providing electrical power to the home 135. The modular inverter system 110 therefore performs several functions in a singular interconnected control system. These functions may include modules for providing one or more automatic transfers between power sources, one or more inverters, one or more battery chargers, one or more charge controllers, one or more electrical panels, electrical surge protection, and electrical circuit breaker protection. Further, each of these functions may be provided with dedicated modules that may be swapped in and out (during operation—referred to as "hot swapping") of a system housing having common backplanes (e.g., a 120/240 VAC backplane and a 48 VDC backplane). Therefore, the overall inverter system 110 is modular, configurable and flexible to meet the needs to almost any configuration of equipment. These modules and associated features are discussed next with respect to FIG. 2.

Figure 2:
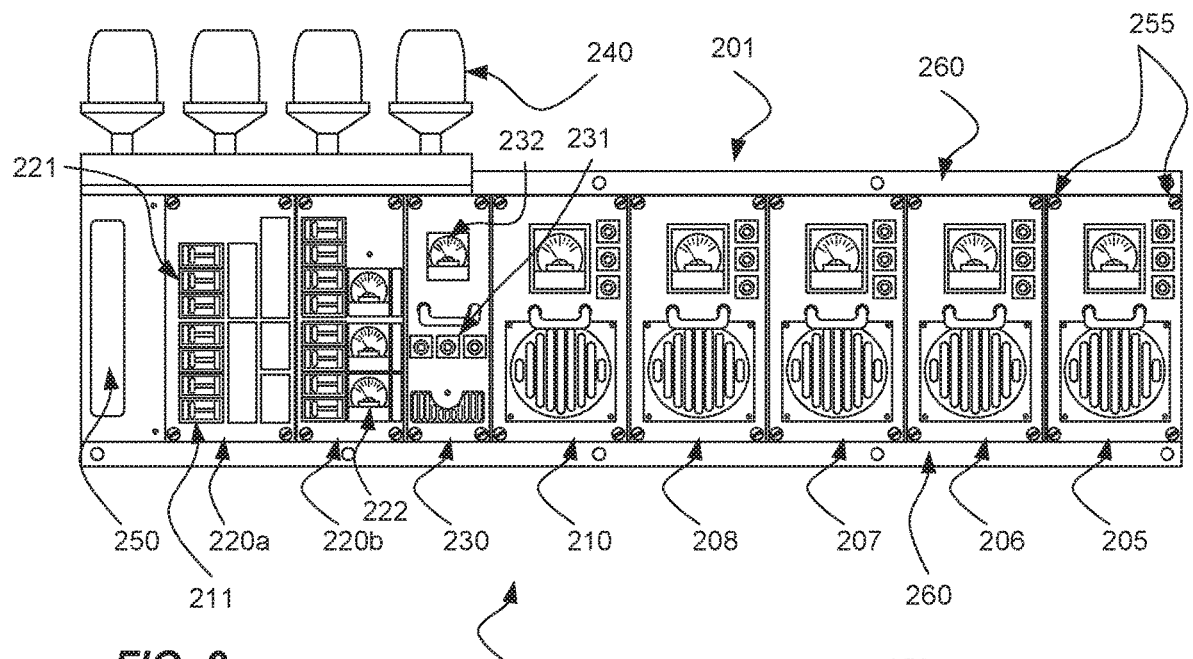
FIG. 2 is a diagram of the modular inverter system of FIG. 1 according to an embodiment of the subject matter disclosed herein.

FIG. 2 is a diagram of the modular inverter system of FIG. 1 according to an embodiment of the subject matter disclosed herein. As discussed above with respect to FIG. 1, the modular inverter system 100 includes a number of modules for facilitating various interconnection between power sources and power sinks. Such interconnections are managed in a manner that will convert power signals from any power source to a suitable power condition (e.g., electrical power at a nearly constant voltage of 120/240 VAC with a nearly constant frequency of 60 Hz) for use at the power sink—in the case of FIG. 1, a residential home 135. Several different modules are shown in FIG. 2, but a skilled artisan understands that the configuration shown in FIG. 2 is but one example. In the example of FIG. 2, the modules include an electrical panel module 210, a set of four inverter/charger modules 205-208, a charge controller module 210, a system controller module 230, and an electrical interconnection panel module 220A/B. The modular inverter system 110 may further include one or more handles 250. Each of these modules may be configured to be inserted into a rack-style housing 201, wherein at least some of these modules may be pulled out or inserted while other modules remain functional and in use. Prior to discussing the inter-related functionality of the modules within the modular inverter system 110, each of the modules is described next with respect to individual underlying functionality.

The first module to be discussed is one of the set of four inverter/charger modules 205-208; for the sake of selecting one module for the purpose of exemplary discussion, inverter/charger module 205 will be used. The inverter/charger module 205 comprises two portions: an inverter portion and a charger portion. The inverter portion, sometimes called a power inverter, is an electronic device having circuitry that changes direct current (DC) to alternating current (AC). The input voltage, output voltage and frequency, and overall power handling depend on the design of the specific device or circuitry. Thus, one function of the inverter portion is to convert a 48 VDC signal from a battery array (120 of FIG. 1) to a 120/240 VAC signal at 60 Hz for use at a power sink, such as a residential home (135 of FIG. 1). Inverters are often rated in terms of power (e.g., watts) that the circuitry can handle. In one embodiment, each modular inverter 205 can handle approximately 2 kW or power, however, other sizes are possible and each inverter in the set of five inverter/charger modules need not be matched. Further, not all five spaces need be filled with an inverter/charger module.

The second portion of the inverter/charger module 205 comprises a battery charger portion. A battery charger, or simply charger, is a device used to inject energy into a one or more cells of a rechargeable battery by coupling an electric current from a power source (e.g., the battery 120, the grid 130, the generator 140 and the like as shown in FIG. 1). The charging procedure depends on the size and type of the battery being charged. Some battery types have high tolerance for overcharging and can be recharged by connection to a constant voltage source or a constant current source. Once charged (determined via common battery charge level monitoring), the charger may be disconnected from the battery at the end of the charge cycle, or may have a timer to cut off charging current at a fixed time.

Thus, the inverter/charger module 205 may function as an inverter when the power source for supplying power to the home 135 is the battery 120 (e.g., off-grid and not on generator power). In such a mode, the modular inverter system 110 may also invoke the charger portion of each inverter/charger module 205-209 to continue providing a charge signal from an off-grid power source (e.g., the solar panel 115 or wind turbine 118). In a reciprocal manner, the inverter/charger module 205 may function as a charger when the power source for supplying power to the home 135 is the grid 130 or the generator 140 such that power is drawn from the grid 130 or generator 140 to charge the battery 120.

When one or more inverter/charger modules 205-208 are used to provide charge to the battery 120, a charge controller module 210 may be also used to monitor and facilitate a more efficient transfer of electrical energy from one of the various power sources to the battery array 120. A charge controller, (sometimes called a charge regulator or battery regulator) may be used to limit the rate at which electric current is fed to or drawn from the battery array 120. The charge controller module 210 may be further controlled by the system controller module 230 such that overcharging may be prevented to protect against overvoltage, which can reduce battery 120 performance or lifespan, and may pose a safety risk. In conjunction with the system controller module 230, the charge controller module 210 may also prevent completely draining ("deep discharging") the battery array 120, or perform controlled discharges, depending on the battery technology, to protect battery life. Upper and lower limits of battery voltage may be set by the system controller module 230 for the purposes of engaging the charge controller module 210.

If the charge controller 210 is to be used to facilitate efficient charging of the battery array 120 from power derived from an off-grid power source (e.g., the solar panel 115 or the wind turbine 118), the charge controller module 210 may be used to maximize the efficiency of power transfer. This may be accomplished with a charge controller module 210 that includes a Maximum Power Point Tracking (MPPT) feature such that the voltage generated from the off-grid power source may be tracked to determine an optimal current to be used to charge the battery array 120. MPPT is a technique used commonly with wind turbines and photovoltaic (PV) solar systems to maximize power extraction under all conditions. A particular problem addressed by MPPT is that the efficiency of power transfer from the solar cell or wind turbine depends on both the amount of sunlight falling on the solar panels or wind speed and the electrical characteristics of the load. As the amount of sunlight or wind varies, the load characteristic that gives the highest power transfer efficiency changes, so that the efficiency of the system is optimized when the load characteristic changes to keep the power transfer at highest efficiency. This load characteristic is called the maximum power point and MPPT is the process of finding this point and keeping the load characteristic there. Electrical circuits can be designed to present arbitrary loads to the photovoltaic cells and then convert the voltage, current, or frequency to suit other devices or systems, and MPPT solves the problem of choosing the best load to be presented to the cells in order to get the most usable power out.

Embodiments of the charge controller module 210 may include inputs for 200 VDC and 600 VDC. The 200 VDC embodiment is capable of handling 120-160 amps making such charge controller modules 210 among the largest in the market. The 600 VDC embodiment is capable of handling 100 amps making such charge controller modules 210 the largest in the present-day market. Further, in the modular inverter system 110 can be configured to have a mix of charge controller modules 210 including different versions (e.g., a 200 VDC version next to a 600 VDC version) such that different sets of solar panels and/or wind turbines may be accommodated.

The charge controller module 210 may also include indicator lights 231 showing the state of the charge controller (e.g., currently charging battery at a first indicator light, currently discharging the battery at a second indictor light, and battery disconnected at a third indicator light). Further, the charge controller 210 may include a current meter 232 showing current flow to or from the battery and may be set manually to monitor specific currents.

The modular inverter system 110 may also include an electrical panel 220A/B that may be coupled to various loads or power sinks via circuit breakers/disconnects. The electrical panel 220A/B provides circuit breakers 211 for each circuit load to be fed. In FIG. 1, the electrical panel 220A/B is shown as a first module ("A") and a second module ("B") though these modules need not be separate and can be one single large module ("A/B"). These circuit breakers may correspond to the disconnect switches 116, 119, 121, 131, 136, and 141 depicted in FIG. 1. The circuit breakers may typically range in size from 15 amps to 200 amps and may be configured to directly receive circuit wires through a rear-panel harness (not shown). The electrical panel 220A/B may include spaces for additional circuit breakers that have yet to be installed. The entire electrical panel module 220A/B itself is modular in that the electrical panel module 220A/B may be inserted and removed from the housing such that the module interfaces with a backplane voltage bar (not shown in FIG. 2).

The electrical panel module 220A/B may include an AC bypass switch 221 that is configured to couple one or more AC inputs directly to one or more AC output nodes and to decouple the AC bus that is part of the backplane of the modular inverter system 110. In this manner, one can bypass the modular inverter system 110 for the purposes of maintenance and troubleshooting without risk of electric shock from components coupled to the AC bus. The electrical panel module 220A/B may feature the circuit breaker/disconnect switches (e.g., 116, 119, 121, 131, 136, and 141 of FIG. 1), in reachable positions such that an operator may manually connect or disconnect any switch at any time. However, the modular inverter system 110 may provide hardware-based or software-based safety provisions that do not allow certain circuit breakers/disconnect switches to be simultaneously connected. Further, the electrical panel module 220A/B may include a number of meters 222 for monitoring current flow to and from various power sources and power sinks.

The modular inverter system 110 may also include one or more surge protection devices 240. A surge protection device (sometimes called, surge protector, surge suppressor, surge diverter, or lightning arrestor) is an appliance or device designed to protect electrical devices from voltage spikes. The surge protection device 240 attempts to limit the voltage supplied to an electric device by either blocking or shorting to ground any unwanted voltages above a safe threshold. Lastly, the modular inverter system 110 may also include a simple handle module 250 for handling the overall housing. This handle module 250 may be replaced with a number of other more useful electrical-based modules.

Figure 4:
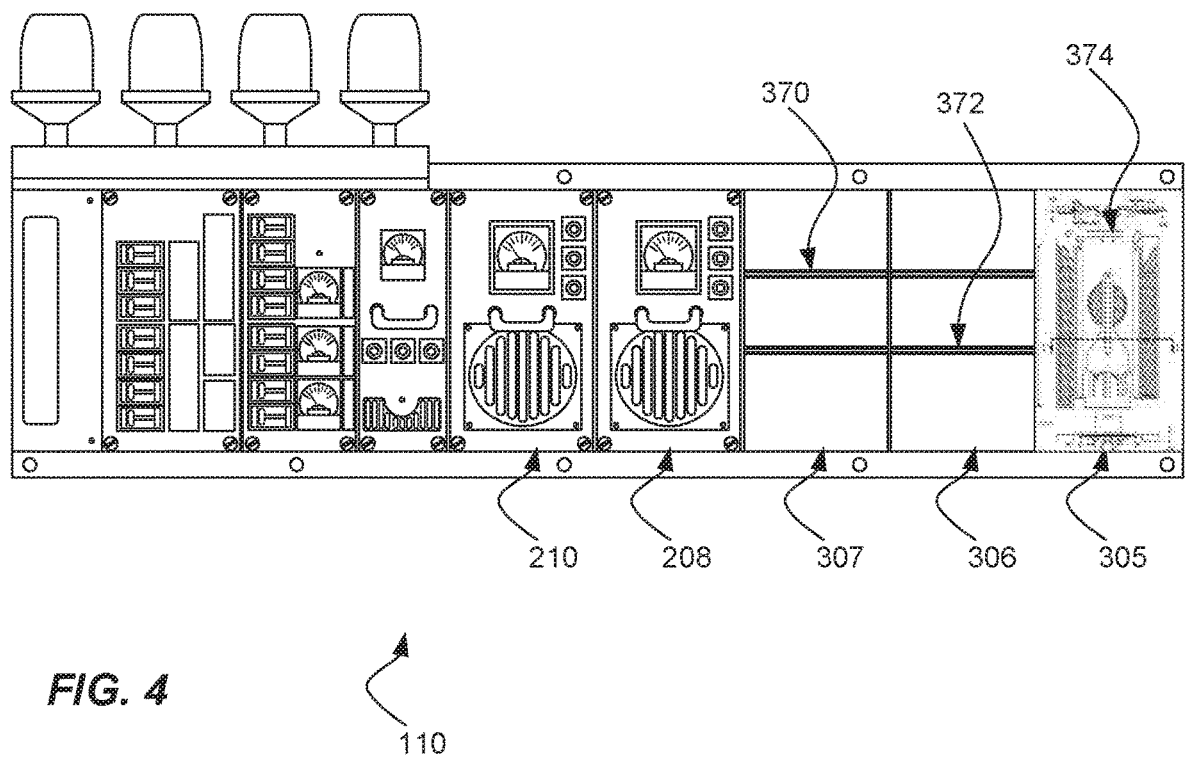
FIG. 4 is a diagram of the modular inverter system of FIG. 1 having some inverter/charger modules removed according to an embodiment of the subject matter disclosed herein.

The modular inverter system 110 when equipped with the modules as shown provides a number of advantages when used within the system 100 of FIG. 1. One advantage is that the modular inverter system 110 is, in fact, modular. This allows any of the modules to be hot swapped while any power source remains engaged and providing power to any connected load. In this embodiment, there are five "power" module spaces shown that are currently filled with inverter/charger modules 205-208. In other embodiments, there may be only three power modules (differentiated from module spaces reserved for control features, such as modules 210, 220A/B, and 230). In still further embodiments, there may more than five modules or a second housing (not shown) with additional power module spaces electrically coupled to a first housing 201. Further yet, not all power module spaces need be filled (as is shown in FIG. 4 and discussed below).

The modules may be easily swapped in and out using simple securing mechanisms such as thumbscrews 255. Such thumbscrews typically do not require any tool to operate and actuate. Further, the housing may include wing brackets 260 for mounting to a wall using conventional screws or other fastener. The weight of the modular inverter system 110 is small enough to not require triangle bracing or other form of support from below. Additional features of the modular inverter system 110 are discussed further below in the context of FIGS. 3-5.

Figure 3:
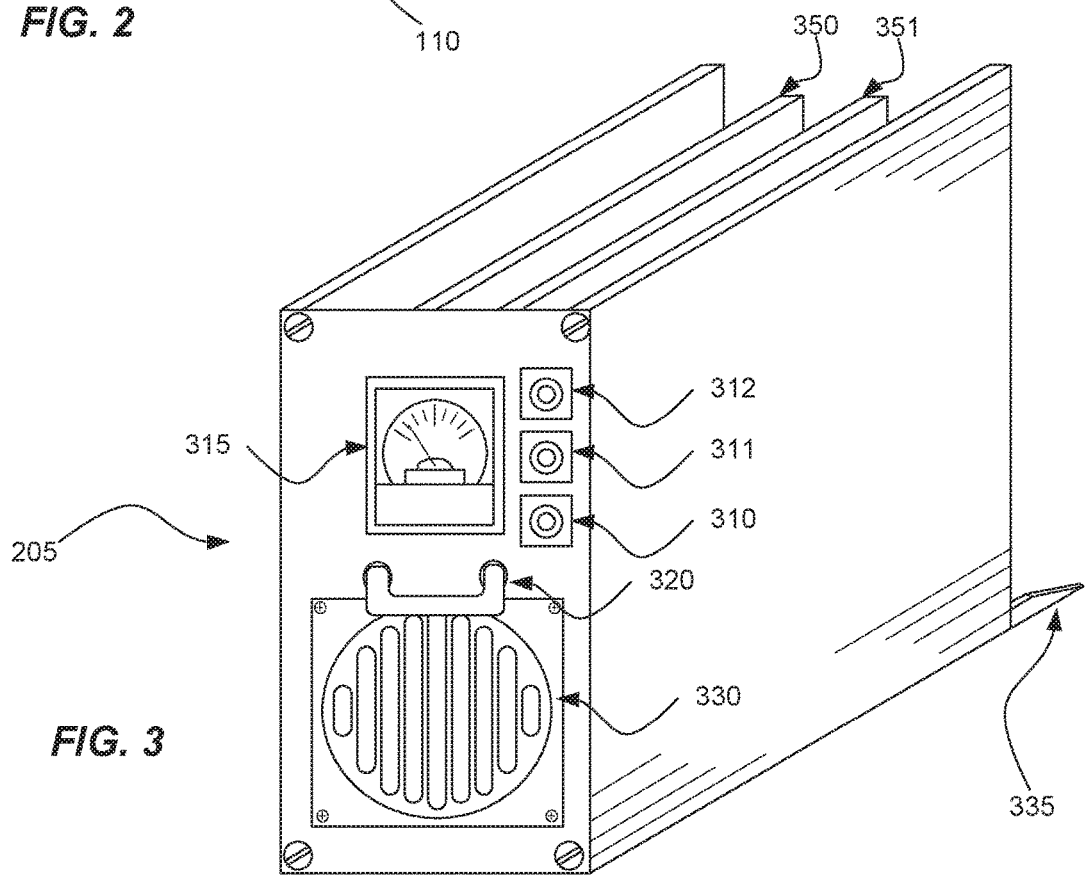
FIG. 3 is a diagram of one inverter/charger module of FIG. 2 according to an embodiment of the subject matter disclosed herein.

FIG. 3 is a diagram of one inverter/charger module 205 of FIG. 2 according to an embodiment of the subject matter disclosed herein. The inverter/charger module 205 is shown disengaged from any modular inverter system 110 so that additional features may be seen. Specifically, two different internal protrusions 350 and 351 are shown. These protrusions 350 and 351 may be printed circuit boards (PCB) having electronic components configured to be coupled the inverter/charger module 205 to one or more internal busses in a modular inverter system 110. Thus, a first PCB protrusion 350 may be a circuit configured to engage a 48 VDC bus such that the inverter/charge module may draw power from the battery (120 of FIG. 1—also coupled to the 48 VDC bus) to be inverted into a voltage signal at nearly 120/240 VAC and nearly 60 Hz. The inverted 120/240 VAC signal is routed to the second PCB protrusion 351 to be coupled to a second bus that is for 120/240 VAC and coupled to the home 135 and/or grid 130. Thus, when the inverter/charger module 205 is being used as an inverter, a 48 VDC signal is drawn from the battery and inverted to a 120/240 VAC signal for use at the load.

Likewise, the second PCB protrusion 351 may be a circuit configured to engage a 120/240 VAC bus such that the inverter/charge module 205 may draw power from the grid (130 of FIG. 1—also coupled to the 120/240 VAC bus) to be converted into a voltage signal at nearly 48 VDC. The converted 48 VDC signal is routed to the first PCB protrusion 350 to be coupled to a first bus that is for 48 VDC and coupled to the battery 120. Thus, when the inverter/charger module 205 is being used as a charger, a 120/240 VAC signal is drawn from the grid 130 (or generator 140) and converted to a 48 VDC signal for charging the battery 120.

In an embodiment, inverter/charger module 205 is rated to provide approximately 2000 watts of continuous power inverted from a coupled battery 120 wherein the battery 120 is coupled to a 48 VDC nominal input. When used as a charger, the inverter/charger module 205 includes circuitry to provide power factor correction depending on the current charge state of the coupled battery 120. Each inverter/charger module includes indicator lights for various states of operation. In one embodiment, these indicator lights include inverter engaged 310 (e.g., power on), input voltage present 311 and a scale light 312 indicative of the what a local meter is measuring. Further, the inverter/charger module 205 includes a meter 315 for current flow (either to the battery 120 when charging or to the home 135 when inverting). Further yet, inverter/charger module 205 includes a fan port 330 for providing an airflow path through the inverter/charger module 205 for cooling the inverter/charger module 205.

In this embodiment, the inverter/charger module 205 is hot swappable. Thus, an operator may use a front-panel mounted handle 320 to pull the inverter/charger module from the housing (assuming the thumb screws have been disengaged). This pulling motion will disengage connectors on each PCB board 350 and 351 and may result in a current arc (e.g., current spike). Such current spikes may cause voltage fluctuations. However, built-in circuitry in each PCB board 350 and 351 provides a current path such that all voltage above 30V are dissipated within 0.5 seconds after backplane connectors disengage. Further, each inverter/charge module 205 includes on-board fuses for AC input/output and for DC input. Thus, a defective module 205 blows local fuses rather than taking down the entire modular inverter system 110 by blowing a battery breaker. Further yet, the indicator lights 310-312 may be powered separately from a local 9V battery so that the indicator lights 310-312 continue to function even when the inverter/charger module 205 fails. Additionally, the inverter/charger module includes a safety door engagement protrusion 335 that will be discussed in greater detail below with respect to FIG. 4.

FIG. 4 is a diagram of the modular inverter system 110 of FIG. 1 having some inverter/charger modules removed according to an embodiment of the subject matter disclosed herein. The modular inverter system 110 shown in FIG. 4 is similar to the modular inverter system 110 of FIG. 2 except that three particular inverter/charger modules 205, 206, and 207 are removed to show empty spaces 305, 306, and 307. The empty spaces show inside the housing 201 such that couplings to two backplane busses can be illustrated. The busses are exaggerated here for illustration purposes and a typical module bay may only include an electrical interface such that protruding PCB edges of various module may "stab" into the open interfaces. Other manners of interfacing swappable modules with backplane busses are contemplated but shown for brevity.

The first backplane bus in a 48 VDC backplane bus 370 and the second backplane bus shown is a 120/240 VAC backplane bus 372. The inverter/charger module 208 and the charge controller module 210 may engage these backplane busses with respective stab-in connectors that may be part of respective PCB protrusions 350 and 351 as shown in FIG. 3. However, when such modules are removed (e.g., during a hot swap or if such modules are not needed), one can see that the backplane busses 370 and 372 or interfaces to such busses are exposed. Such exposure may be dangerous to operators who may touch said backplane busses accidentally.

To prevent accidental shock hazard and to comply with electrical code and electrical standards (e.g., UL listing and the like), each empty space may include a movable safety door 374. In FIG. 4, one safety door 374 is shown at space 305 (space 306 and 307 do not shown any safety door so as to illustrate backplane bus bars 350 and 351. Safety door 374 may be spring-mounted such that as a module is pulled from housing, the safety door 374 swings down into place. Further, the safety door may include a locking mechanism (not shown in detail) preventing the safety door 374 from swinging back open when any force is applied to the front of the door 374. The locking mechanism may be released when a safety door engagement protrusion 335 of any module (such as the module 205 depicted in FIG. 3). The safety door 374 may also be opened using a tool (also not shown) designed to disengage the locking mechanism. Providing a closed and locked safety door 374 improves air flow across the backplane bus bars 350 and 351 no module is installed. In other embodiments, air restrictors (e.g., empty modules) may be installed in module bays that are empty so cooling air is not channeled into an empty module bay. In this manner, unique airflow routes for providing cooling air above and below installed modules to get to each module bay is maintained.

The busses 370 and 372 may be monitored by the system controller module 230 for voltage level and current flow. Further, each inverter/charger module may also monitor each bus for voltage level and current flow. In this manner, the system controller 230 may then engage of disengage various module functionality as is needed. Thus, the system controller module may be a master controller over other module functionality and embodies logically-based decision circuitry to determine if electric power is to be stored at the battery via a charging procedure or sold back to the grid using an electric grid tie-in procedure. The system controller module 230 may control the flow of electric current on the backplanes via a set of electronic relays (not shown) that may be actuated to couple various circuits to one or both busses.

For example, in a home 135 equipped with a generator 140 and the modular inverter system 110, when an electric grid 130 outage occurs, the system controller module 230 may initiate a startup sequence at the generator 140. Once the system controller module 230 senses that the generator voltage is sufficiently high enough to provide proper electric power, the system controller module 230 disconnects the electrical grid 130 (via electronic relays) and connects the generator 140 (also via electronic relays to the AC bus. The generator 140 supplies power to the home 135, but is not connected to the electrical grid 130. Further, the battery 120 may be charged from power drawn from the now connected generator 140. It is necessary to isolate the generator 140 from the distribution system to protect the generator from overload in powering loads in the home 135 and for safety, as utility workers expect the electric grid 130 lines to be dead.

Figure 5:
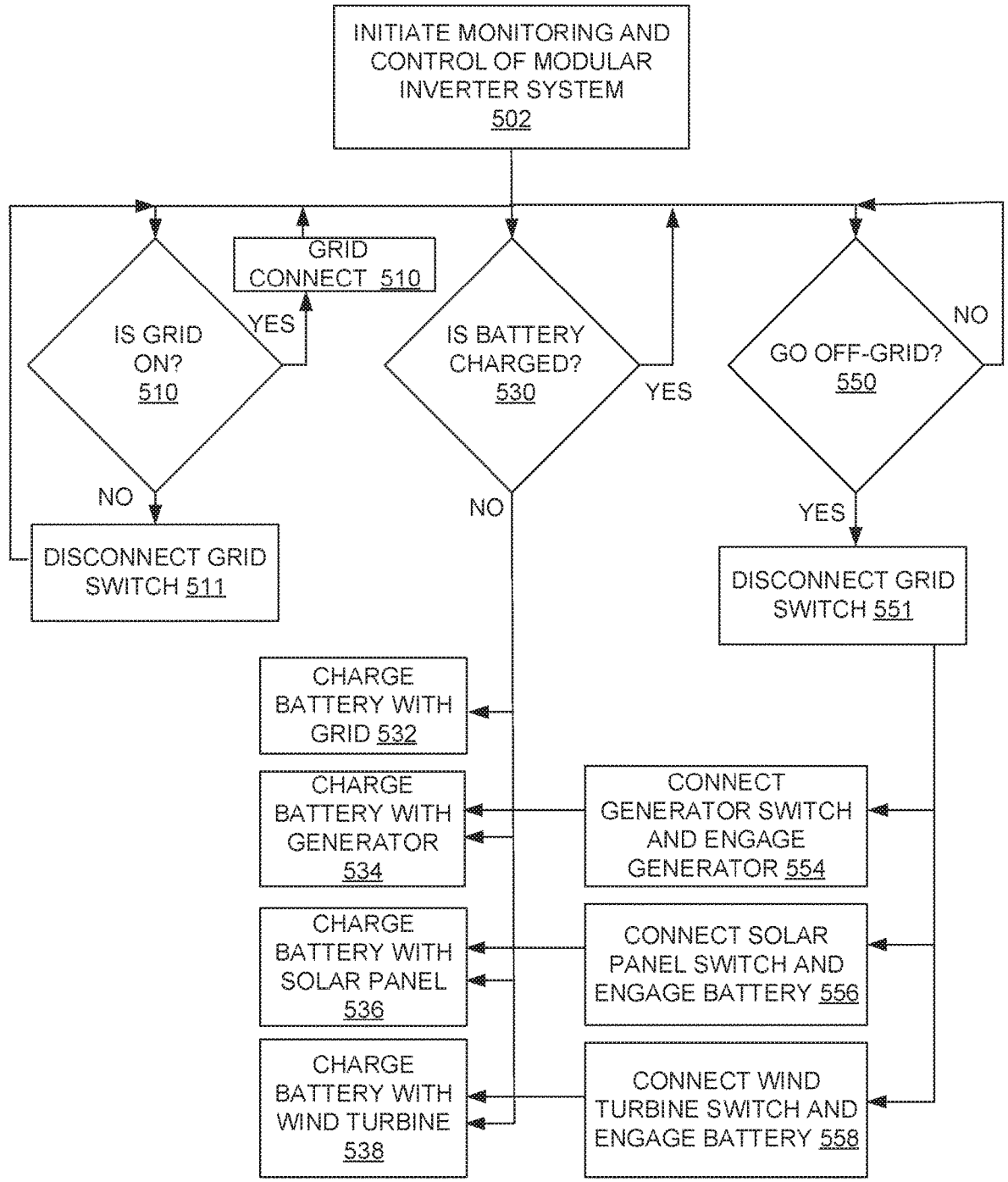
FIG. 5 is a flow chart of a method for handling power routing within the modular inverter system of FIG. 1 according to an embodiment of the subject matter disclosed herein.

FIG. 5 is a flow chart 500 of a method for handling power routing within the modular inverter system of FIG. 1 according to an embodiment of the subject matter disclosed herein. The method steps as depicted in FIG. 5 may be performed in any order and the order in which the flow chart 500 is arranged and describe is but one embodiments of various method for operating the systems as described in FIGS. 1-4. Generally speaking, the method of the flow chart 500 of FIG. 5 may be initiated at step 502 when monitoring and control of the modular inverter system 110 of FIG. 1 is undertaken.

After initiation of control and monitoring at step 502, a number of sub-methods may be accomplished discretely or simultaneously and in any combination. These three sub-methods may generally be thought of as 1) monitoring for grid connectivity, 2) charging the battery, and 3) maintaining off-grid power generation and consumption. These sub-methods may be in a continuous monitoring state whereby method iterates through three particular queries: 1) is the grid functional 510, 2) is the battery fully charged 530 and 3) should the overall system shift to off-grid power generation and consumption 550.

Turning the first query 510—whether the grid is functioning, the method may determine that the grid is, in fact, functioning. If so, the grid disconnect switch (131 of FIG. 1) may be automatically engaged (e.g., closed) at step 510 such that the grid is coupled to the home 135. This may be a steady state such that the state of the grid is continuously monitored at query 510. If, however, the grid 130 is determined to be not functioning (e.g., the grid is down), the grid disconnect switch 131 may be disengaged (e.g., opened) at step 511 such that the home 135 may no longer be powered from the grid 130. In such a case, the method may also then power the home from off-grid sources and charge the battery in the second and third sub-methods as alluded to above.

In a second sub-method, the system may be monitored and controlled such that charge on the battery 120 is maintained at least at a threshold charge via query 530. Such a threshold charge may be queried at step 530. If the charge is sufficient, each of the sub-methods may continue to monitor the status of various parts of the overall system. However, if the battery 120 does not have sufficient charge, one or more power sources may be engaged to provide charge to the less-than-fully charged battery 120. These battery-charging procedures include charging the battery 120 from the grid 135 at step 532, charging the battery from the generator 140 at step 534, charging the battery from the solar panel 115 at step 536, and charging the battery from the wind turbine 118 at step 538.

In a third sub-method, the system may be monitored and controlled for a decision to go off-grid via query 550. If no, then the method may loop back to monitor the three sub-methods. If yes, then the electrical grid disconnect switch 131 may be disengaged at step 551 such that the grid does not provide power to or receive power from the overall system. In such a case, the home may be supplied from one or more of the off-grid power sources. Thus, the home 135 may have power supplied from the generator 140 when the generator disconnect switch is engaged at step 554. Further, the home 135 may have power supplied from the solar panel 115 when the solar panel disconnect switch is engaged at step 556. Further yet, the home 135 may have power supplied from the wind turbine 118 when the wind turbine disconnect switch is engaged at step 558. Each of these sources of power supply for the home may also be used to respectively charge the battery 120 as well.

It should be understood that the present disclosures as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Assembly language Java, JavaScript, C, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

That which is claimed is:

1. A method, comprising:
   receiving AC-power sourced current at an electrical device on an AC bus disposed on a backplane within the device;
   receiving DC-sourced current at the electrical device on a DC bus disposed on the backplane;
   sinking power to a power sink coupled to the AC bus;
   converting AC-sourced current into a DC current to charge a DC source when the electrical device is operating in a first mode; and
   inverting the DC-sourced current into an AC current when the electrical device is operating in a second mode.

2. The method of claim 1, further comprising charging the DC source from a local power generation device.

3. The method of claim 1, further comprising sending AC current from the AC bus to connected AC power grid.

4. The method of claim 1, further comprising:
   monitoring a voltage level on the DC bus; and
   changing the operation from one mode to another mode based on the monitoring of the voltage on the DC bus.

5. An electrical device, comprising:
   a device enclosure having a plurality of module receptacles;
   a charge controller module engaged with one of the plurality of module receptacles and configured to control charging a battery;
   a plurality of inverter/charger modules, each engaged with a respective one of the plurality of module receptacles and configured to convert a first DC voltage to a second DC voltage for charging the battery and configured to invert the first DC voltage to an AC voltage for supplying AC power;
   a controller module engaged with one of the plurality of module receptacles, the controller module configured to control the plurality of inverter/charger modules; and
   a backplane disposed in the enclosure such that each module receptacle facilitates engaging a respective module with the backplane.

6. The electrical device of claim 5, further comprising an electrical panel module engaged with one of the plurality of module receptacles and configured to provide a plurality of circuit breakers for interrupting current to a respective circuit.

7. The electrical device of claim 5, wherein each of the plurality of module receptacles are further configured to interface with any one of a charge controller module, an inverter/charger module, and a controller module.

8. The electrical device of claim 5, wherein each of the plurality of module receptacles are further configured to exchange an engaged module with a previously unengaged module while under power.

9. The electrical device of claim 5, wherein each inverter/charger module is controlled by the controller module to invert DC sourced power to AC when the controller module determines that the electrical device is in inverter mode and to convert AC sourced power to DC when the controller module determines that the electrical device is in charger mode.

10. The electrical device of claim 5, further comprising a respective safety door biased to be in a closed position for each module receptacle that is unengaged by a respective module.

11. The electrical device of claim 5, wherein the backplane further comprises
an AC bus;
a first DC bus;
a second DC bus; and
a plurality of module engagement interfaces configured to respectively couple an engaged module to the AC bus, the first DC bus, and the second DC bus.

12. The electrical device of claim 5, further comprising an overcurrent protection circuit coupled to the backplane.

13. The electrical device of claim 5, further comprising an AC bypass switch configured to decouple the backplane from any source of power.

14. A method, comprising:
receiving a DC-power sourced current at a first node of an electrical device on a first DC bus that is disposed on a backplane within the device;
charging a battery coupled to a second DC bus that is disposed on the backplane, the second DC bus charged with converted current from the first DC-sourced current when the electrical device is operating in a first mode; and
inverting the DC-sourced current into an AC current supplied to an AC bus when the electrical device is operating in a second mode.

15. The method of claim 14, further comprising sinking power to a power sink coupled to an AC bus.

16. The method of claim 14, further comprising charging the battery from a local power generation device.

17. The method of claim 14, further comprising sourcing AC current from a connected AC power grid.

18. The method of claim 14, further comprising:
monitoring a voltage level on the second DC bus; and
changing the operation from one mode to another mode based on the monitoring of the voltage on the second DC bus.

19. The method of claim 14, further comprising:
monitoring a voltage level on the AC bus; and
changing the operation from one mode to another mode based on the monitoring of the voltage on the AC bus.

* * * * *